(No Model.)
A. BALL.
PLOW.
No. 259,659. Patented June 20, 1882.
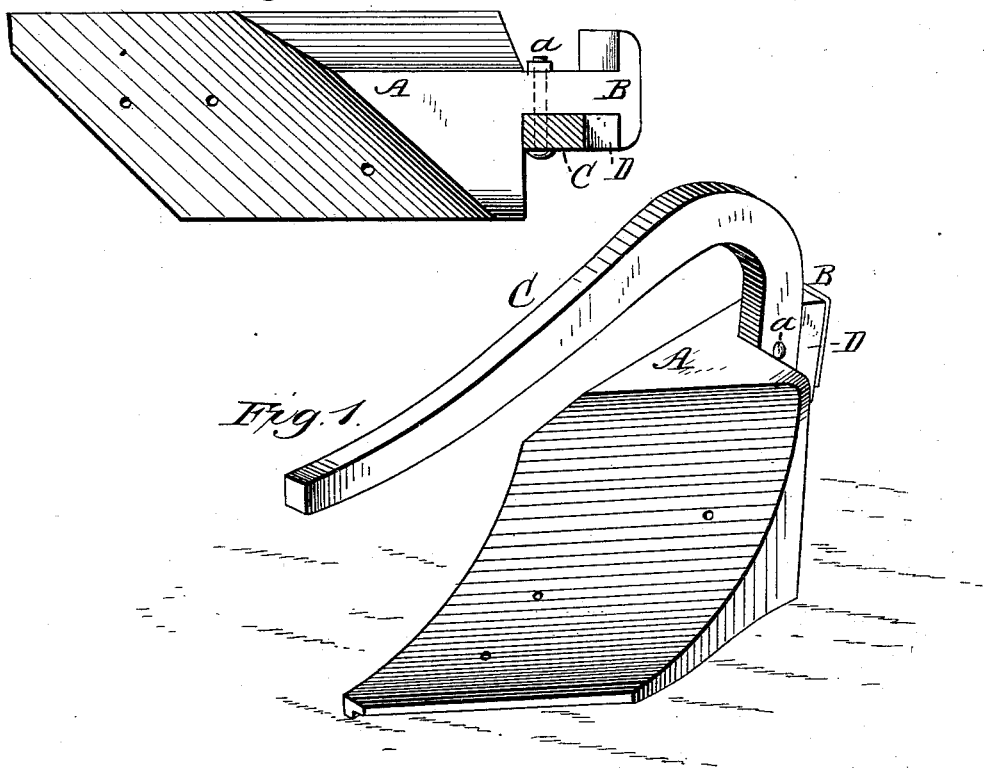
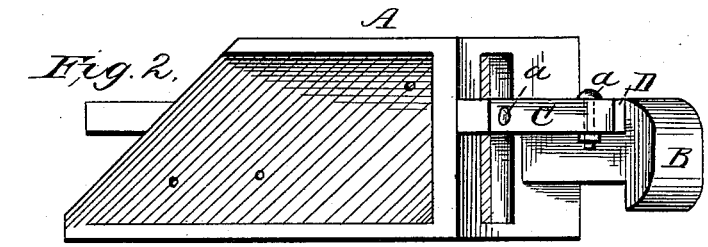
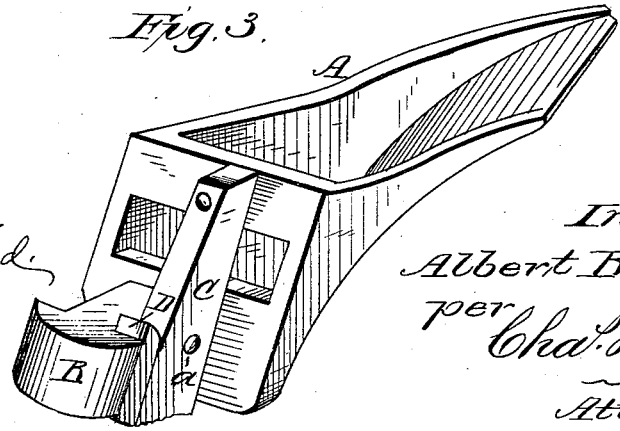
Witnesses.
F. L. Ouraud.
L. L. Miller.
Inventor.
Albert Ball,
per Chas. H. Fowler,
Attorney.

UNITED STATES PATENT OFFICE.

ALBERT BALL, OF CANTON, OHIO.

PLOW.

SPECIFICATION forming part of Letters Patent No. 259,659, dated June 20, 1882.

Application filed December 17, 1881. (No model.)

*To all whom it may concern:*

Be it known that I, ALBERT BALL, a citizen of the United States, residing at Canton, in the county of Stark and State of Ohio, have invented certain new and useful Improvements in Plows; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an under side plan view of the same. Fig. 3 is an under side perspective; and Fig. 4 is a top plan view, with the beam in section.

The present invention has relation to certain new and useful improvements in that class of plows in which the beam thereof is connected in such manner as will admit of the position of the beam being changed to adapt the plow to two or three horses, as circumstances require.

The object of the invention is to improve the manner of connecting the beam to the plow, whereby it can be readily detached and removed and again connected, to accommodate the plow to the use of two or three horses, and at the same time secure a center draft, substantially as shown in the drawings and hereinafter described.

In the accompanying drawings, A represents the frame of the plow, preferably composed of a single piece of metal, and so formed and constructed as to admit of the ready attachment of the share, mold-board, and landside.

To the rear of the frame A is a T-shaped bracket, B, for connecting thereto the plow-beam C by a bolt, *a*, or other desirable means, and assisted in being held firm and stationary to the bracket B by a wedge, D, driven in between the side of the beam and cross-head of the bracket.

When the plow is used for two horses the beam is placed on the left-hand side, and when three horses are used it is placed on the right-hand side, of the T-shaped bracket.

In plows used heretofore it has usually been the custom to turn the beam on a fulcrum and out of line.

The manner of connecting the beam to the plow admits of said beam being detached or removed therefrom, and connected in such manner as to secure a center draft, whether two or three horses are used.

Having now fully described my invention, what I claim as new, and desire to secure by Letters Patent, is—

In a plow, the frame A, having T-shaped bracket B at its rear, in combination with the adjustable plow-beam C, connected thereto, substantially as and for the purpose set forth.

In testimony that I claim the above I have hereunto subscribed my name in the presence of two witnesses.

ALBERT BALL.

Witnesses:
JOHN L. SPANGLER,
FREDERICH W. BOND.